United States Patent [19]

Bamberg et al.

[11] Patent Number: 4,805,218
[45] Date of Patent: Feb. 14, 1989

[54] METHOD FOR SPEECH ANALYSIS AND SPEECH RECOGNITION

[75] Inventors: Paul G. Bamberg, Framingham; James K. Baker, West Newton; Laurence Gillick, Newton; Robert S. Roth, Newtonville, all of Mass.

[73] Assignee: Dragon Systems, Inc., Newton, Mass.

[21] Appl. No.: 34,842

[22] Filed: Apr. 3, 1987

[51] Int. Cl.$^4$ .............................................. G10L 1/00
[52] U.S. Cl. ................................... 381/43; 364/513.5
[58] Field of Search ...................... 384/36, 37, 43, 45, 384/48, 50; 364/513.5

[56] References Cited

U.S. PATENT DOCUMENTS

| | | | |
|---|---|---|---|
| 4,227,177 | 10/1980 | Moshier | 381/45 |
| 4,481,593 | 11/1984 | Bahler | 381/43 |
| 4,489,434 | 12/1984 | Moshier | 381/43 |
| 4,651,289 | 3/1987 | Maeda et al. | 364/513.5 |
| 4,731,845 | 3/1988 | Matsuki et al. | 381/43 |

FOREIGN PATENT DOCUMENTS

87/4294 7/1987 World Int. Prop. O. ............ 381/43

*Primary Examiner*—Bernard Roskoski
*Attorney, Agent, or Firm*—Edward W. Porter

[57] ABSTRACT

A method of speech analysis calculates one or more difference parameters for each of a sequence of acoustic frames, where each difference parameter is a function of the difference between an acoustic parameter in one frame and an acoustic parameter in a nearby frame. The method is used in speech recognition which compares the difference parameters of each frame against acoustic models representing speech units, where each speech-unit model has a model of the difference parameters associated with the frames of its speech unit. The difference parameters can be slope parameters or energy difference parameters. Slope parameters are derived by finding the difference between the energy of a given spectral parameter of a given frame and the energy, in a nearby frame, of a spectral parameter associated with a different frequency band. The resulting parameter indicates the extent to which the frequency of energy in the part of the spectrum represented by the given parameter is going up or going down. Energy difference parameters are calculated as a function of the difference between a given spectral parameter in one frame and a spectral parameter in a nearby frame representing the same frequency band. In one embodiment of the invention, dynamic programming compares the difference parameters of a sequence of frames to be recognized against a sequence of dynamic programming elements associated with each of a plurality of speech-unit models. In another embodiment of the invention, each speech-unit model represents one phoneme, and the speech-unit models for a plurality of phonemes are compared against individual frames, to associate with each such frame the one or more phonemes whose models compare most closely with it.

18 Claims, 11 Drawing Sheets

FIG. 4
```
int16 get_slope(early, now, late, mini, maxi)    —60
uns8 early[], now[], later[];    —62
int16 mini, maxi;    —64
{
int16 i, ii;    —66
int16 slopes[5];    —68
   for (ii=-2; ii<3; ii++) {    —70
       slopes[ii+2] = 0;    —72
       for (i=mini; i<=maxi; i++) {    —74
           slopes[ii+2] += abs(2*now[i]-late[i+ii]-early[i-ii]);    —76
       }    —78
   }    —80
return ((slopes[0]-slopes[4])/8+(slopes[1]-slopes[3])/4);    —82
}    —84
```
FIG. 6A
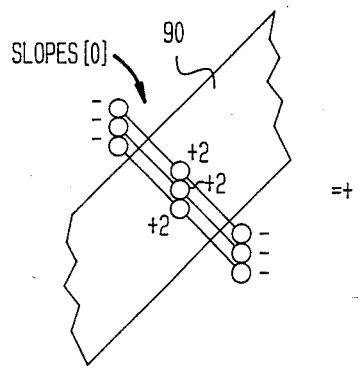
FIG. 6B
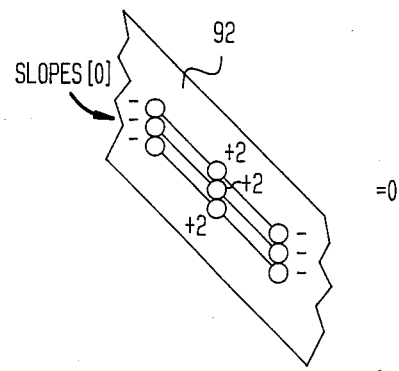
FIG. 6C
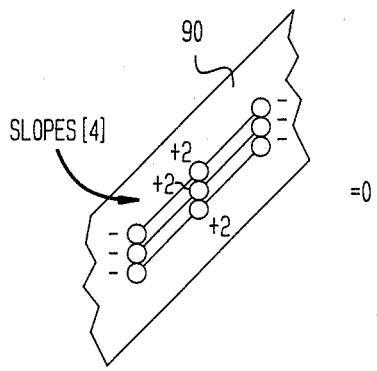
FIG. 6D
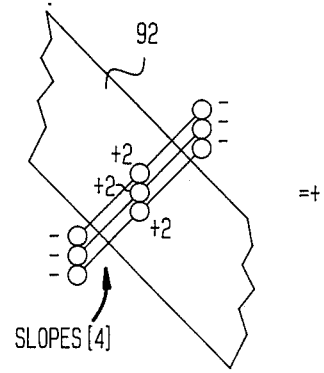

METHOD FOR SPEECH ANALYSIS AND SPEECH RECOGNITION

FIELD OF THE INVENTION

The present invention relates, in general, to methods of speech analysis and speech recognition, and, in particular, to methods of speech analysis and speech recognition which explicitly model changes in acoustic characteristics over time.

BACKGROUND OF THE INVENTION

Due to recent advances in computer technology and improved speech recognition algorithms, speech recognition machines have begun to appear in the past several decades, and have become increasingly more powerful and less expensive.

Most speech recognition systems are frame-based systems, that is, they represent speech as a sequence of frames, each of which represents speech sounds at one of a succession of brief time periods. One such frame-based system is that described in U.S. patent application Ser. No. 797,249, entitled "Speech Recognition Apparatus and Method", which is assigned to the assignee of the present application, and which is incorporated herein by reference. This system represents speech to be recognized as a sequence of spectral frames, in which each frame contains a plurality of spectral parameters, each of which represents the energy at one of a series of different frequency bands. Usually such systems compare the sequence of frames to be recognized against a plurality of acoustic models, each of which describes, or models, the frames associated with a given speech unit, such as a phoneme or a word.

One problem with spectral-frame-based systems is that each frame gives a "snap shot" of spectral energy at one point in time. Thus the individual frames contain no information about whether the energy at various parts of the audio spectrum is going up or is going down in amplitude or frequency.

The human vocal tract is capable of producing multiple resonances at one time. The frequencies of these resonances change as a speaker moves his tongue, lips, and other parts of his vocal track to make different speech sounds. Each of these resonances is referred to as a formant, and speech scientists have found that many individual speech sounds, or phonemes, can be distinguished by the frequency of the first three formants.

Often, however, changes in frequency are important for distinguishing speech sounds. For example, it is possible for two different frames to have similar spectral parameters and yet be associated with very different sounds, because one occurs in a context of a rising formant while the other occurs in a context of a falling formant. Thus it is important for a speech recognition systems to recognize the changes in frequencies as well as the frequencies themselves.

One methods by which the prior art has dealt with the changes in frequencies and other acoustic parameters in frame-based speech recognition systems is by comparing a sequences of frames to be recognized against models of speech units which are formed of a sequence of frame models. Such speech-unit models represent changes in acoustic parameters that take place over the course of the speech-unit they model by using a sequence of frame models with differing parameters. Commonly such systems use dynamic programming algorithms, such as the one described in the above mentioned application Ser. No. 727,249, to find the optimal match between the sequence of frames to be recognized and the speech-unit model's sequence of frame models.

Although the use of such sequential speech-unit models can represent and recognize changes in frequency, its is often not as accurate as desired. This is particularly true if the number of frame models in each speech-unit model is limited to reduce computation. Furthermore, such a sequential speech-unit model is not applicable when one is attempting to place a phonemic label on an individual frame by comparing it with individual frame models, each of which represents a given phoneme.

The prior art has also attempted to explicitly detect frequency changes by means of formant tracking. Formant tracking involves analyzing the spectrum of speech energy at successive points in time and determining at each such time the location of the major resonances, or formants, of the speech signal. Once the formants have been identified at successive points in time, their resulting pattern over time can be supplied to a pattern recognizer which associates certain formant patterns with certain phonemes.

Although formant tracking has certain benefits, it also has certain problems. For one thing, it requires a lot of computation. More importantly, even with a large amount of computation, present-day formant trackers often make errors, such as erroneously determining that a given frequency range contains one formant, when it actually contains two, or determining that it contains two, when it actually contains one. Such mistakes tend to cause speech recognition errors.

SUMMARY OF THE INVENTION

It is an object of the present invention to provide methods of speech analysis and speech recognition which make use of information about changes in acoustic parameters of speech energy.

It is yet another object of the present invention to provide such methods which use information about changes in such parameters in the context of a frame-based representation of a speech signal.

It is still another object of the present invention to provide such methods which use information about changes in frequency of speech energy, and which do so in a relatively computationally efficient manner.

It is a further object of the present invention to provide methods of using information about changes in frequency of speech energy which are relatively immune from making the type of perceptual errors which formant tracking systems are capable of making.

It is yet another object of the present invention to provide such methods which make information about changes in acoustic parameters available in phonemic frame labeling systems in which individual frames are labeled by a phonemic label.

According to one aspect of the present invention, the invention provides a method of speech analysis which can be used for purposes such as the study of speech or speech recognition. The method comprises representing speech as a sequence of frames. Each frame represents the speech at one of a succession of brief time periods. Each frame contains a plurality of spectral parameters, each of which represents the energy at one of a series of different frequency bands. The method finds the difference between the energy of a given spectral parameter of a given frame and the energy, in a nearby frame, of a spectral parameter associated with a different frequency band. The method uses this difference to calculate a slope parameter which indicates the extent to which the frequency of the energy in the part of the spectrum represented by the given parameter is going up or going down.

In some embodiments, the method is used for speech recognition. This is done by calculating slope parameters for a sequence of frames and comparing the resulting slope parameters against each of a plurality of models which represent speech units, such as phonemes or complete words. Each speech-unit model has a model for the slope parameters of the frame associated with its corresponding speech unit. Preferably, each speech-unit model also has a model for the spectral parameters of the frames of its corresponding speech unit, and the comparing of frames against speech-unit models also includes comparing the spectral parameters of individual frames against the spectral parameter models of the speech-unit models.

In one embodiment, each speech-unit model is comprised of a sequence of dynamic programming elements, each of which includes one or more slope parameter models. Dynamic programming is used to compare the slope parameters associated with a sequence of frames against the sequence of dynamic programming elements associated with each speech-unit model.

In some embodiments, the method finds a difference between a given spectral parameter of a given frame and a spectral parameter in a following frame which differs in frequency from the given parameter by X. The method also finds the difference between the given spectral parameter and a spectral parameter in a preceding frame which differs in frequency from the given parameter by approximately −X. The method combines these two differences to form a summed difference, which is used to calculate a slope parameter.

In some embodiments, the method finds a difference between the given spectral parameter and a spectral parameter in a nearby frame whose frequency is above that of the given frame by X. In this embodiment, the method also finds the difference between the given spectral parameter and a spectral parameter in that same nearby frame whose frequency is below that of the given frame by approximately X. The method combines the negative of one such difference with the value of the other, to form a net difference. This net difference is used to calculate a slope parameter. Preferably this method also finds similar differences between the given parameter and parameters in the nearby frame whose frequencies are Y above and Y below that of the given parameter, where Y is different than X. In such a case, the method adds the negative of one of those similar differences and the value of the other to the net difference.

In some embodiments, the finding of the difference between a given spectral parameter and another spectral parameter in a nearby frame is performed for each of a group of given spectral parameters which represent a certain part of the frequency spectrum, and the resulting differences calculated for that group are combined to form a slope parameter which indicates whether the frequency of energy in that certain part of the spectrum is going up or going down.

In one embodiment, the frames whose parameters are compared to calculate slope parameters are directly adjacent each other. In other embodiments they are separated by at least one intervening frame.

According to a broad aspect of the present invention, a method of speech recognition is provided which calculates one or more difference parameters for each of a plurality of frames, where each difference parameter is a function of the difference between an acoustic parameter in one frame and an acoustic parameter in a nearby frame. The method compares the difference parameters associated with individual frames against each of a plurality of acoustic models representing speech units, where each speech-unit model has a model for the difference parameters associated with frames of its corresponding speech unit.

Preferably the difference parameters are either slope parameters, of the general type described above, or energy difference parameters. Each energy difference parameter is calculated as a function of the difference between a given spectral parameter in one frame and a spectral parameter in a nearby frame representing the same frequency band. Preferably the speech-unit models have models of spectral parameters, as well as difference parameters, which are compared against the frames; and preferably some of the difference parameters associated with each frame are slope parameters and some are energy difference parameters.

In one embodiment, dynamic programming compares the difference parameters of the sequence of frames to be recognized against a sequence of dynamic programming elements associated with each of a plurality of speech-unit models. In another embodiment, each speech-unit model represents a given phoneme, and the speech-unit models for each of a plurality of phonemes is compared against individual frames, so as to associate with such frames the one or more phonemes whose models compare most closely with it.

DESCRIPTION OF THE DRAWINGS

These and other aspects of the present invention will become more evident upon reading the following description of the preferred embodiment in conjunction with the accompanying drawings, in which:

FIG. 4 is a subroutine written in the C programming language which performs the slope parameter calculations in the preferred embodiment of the invention;

FIGS. 6A, 6B, 6C, 6D, and 6E are schematic representations of how the differences represented in FIGS. 5A and 5E are affected by rising frequencies, falling frequencies and constant frequencies;

DETAILED DESCRIPTIONS OF PREFERRED EMBODIMENTS

Figure 1:
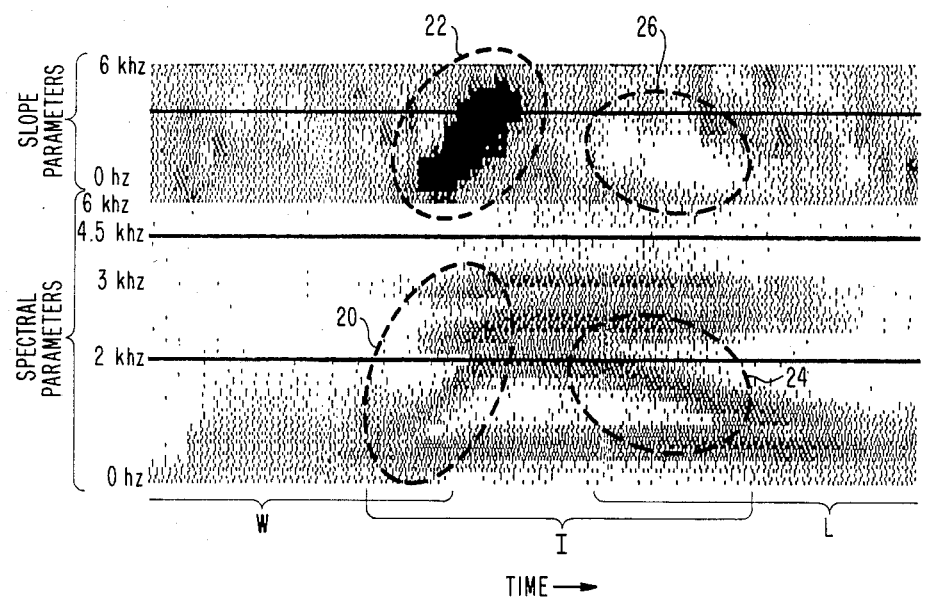
FIG. 1 is a spectrogram produced by plotting a sequence of frames along the horizontal axis, in which each frame has a sequence of parameters running along the vertical axis, with the bottom two thirds of these parameters representing spectral parameters and with the top one third representing slope parameters calculated according to an embodiment of the present invention.

Referring now to FIG. 1, a spectrogram produced by a preferred embodiment of the present invention is shown. The spectrogram represents a speech signal produced by speaking the word "will" (with the representation ending somewhat before the completion of the final "L" sound). The spectrogram plots a sequence of frames, each representing the speech signal during a successive one one-hundredth of a second, along the horizontal axis. Each frames has thirty-six parameters which extend parallel to the vertical axis. Although the boundaries of individual frames and parameters are not clearly marked, the magnitude of each parameter is indicated by the darkness of its associated area on the spectrogram. The 24 parameters in the bottom two thirds of the graph are spectral parameters, each representing the amount of energy contained in the speech signal at a given frequency range during a given frame. The 12 parameters in the top one third of the spectrogram are slope parameters calculated according to a preferred embodiment of the present invention.

By looking at the spectral representation in the bottom two thirds of FIG. 1, one can see that at most points in time the speech energy is concentrated into frequency bands. These frequency bands result from the resonances which result from various configurations of the human vocal tract. Speech scientists call these vocal resonances formants. One can see that in the initial part of the spectrogram, that labeled "W", the formants are relatively constant in frequency and are located at a low frequency. In the middle of the portion labeled "I", there are four clearly defined and relatively constant formants. In the end of the portion labeled "L", it can be seen that the formants have returned to a low frequency pattern somewhat like that at the beginning of the "W". But in the periods in which the speech sound makes a transition from the "W" to the "I" and from the "I" to the "L" the formants, instead of being constant, change in frequency, as is indicated in the area 20, in which the formant frequencies are rising in frequency, and in the area 24, in which they are falling in frequency.

In order to enable speech recognition systems, and particularly frame based speech recognition systems, to better detect such changes in frequency, the present invention provides means for calculating slope parameters, such as the slope parameters shown in the upper one third of FIG. 1. In this embodiment, the slope parameters represent whether the frequency of sound energy is rising or falling within various ranges of frequencies represented by the spectral parameters shown in the bottom two thirds of the spectrogram. Where spectral parameters in the bottom two thirds of the figure indicate rising frequencies, as in the area 20, the corresponding slope parameters in the top one third are darker than average, as in the area 22. On the other hand, where the spectral parameters indicate falling frequencies, as in the area 24, the slope parameters are lighter than average, as in the area 26.

Figure 2:
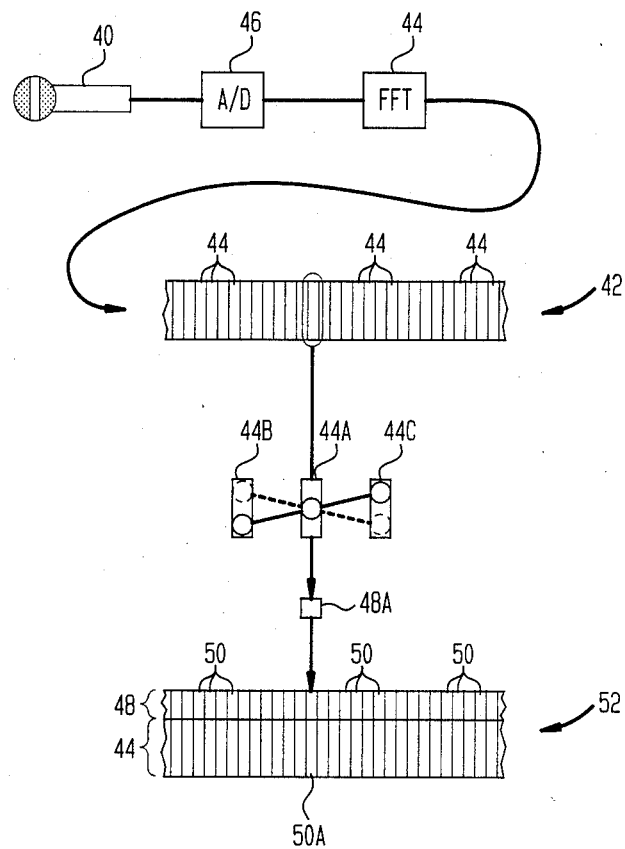
FIG. 2 is a schematic representation of the method by which a preferred embodiment of the invention represents a speech signal as a sequence of spectral frames, calculates slope parameters by comparing spectral parameters of a given frame with different spectral parameters in frames before and after it, and then adds the resulting slope parameters to the sequence of frame to create a sequence of augmented frames.

FIG. 2 is an abstract representation of the basic method provided by a preferred embodiment of the present invention. According to this method a speech signal, such as one spoken into a microphone 40 is represented as a sequence 42 of individual spectral frames 44. As is well known in the art of speech processing, such a transformation can be made by converting the speech signal into a digital time-domain representation. This is done with an analog-to-digital converter 46, which samples the analog value of the signal produced the microphone 40 at each of a succession of times, and converts each such value into a corresponding digital value. Then a Fourier transform means, such as a fast Fourier transform means 44, converts that time-domain representation into a frequency-domain representation comprised of the sequence of spectral frames 42.

Figure 3:
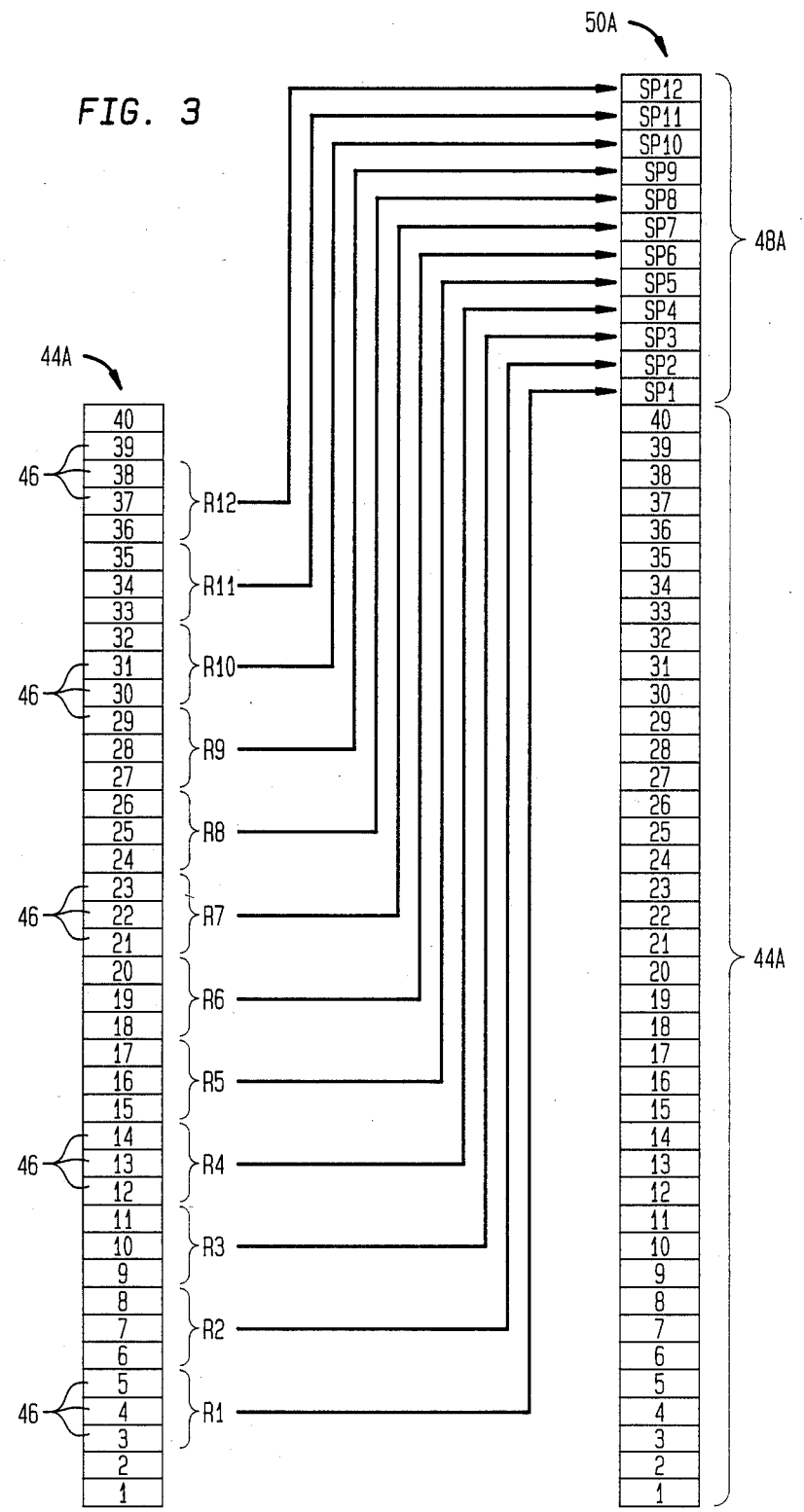
FIG. 3 is a schematic representation of how each frame is comprised of a plurality of spectral parameters, of how these spectral parameters are divided into ranges of spectral parameters, of how slope parameters are calculated in association with each such range of spectral parameters for each frame, and of how the resulting slope parameters are added to the frame to create an augmented frame.

As is shown in FIG. 3, each of the spectral frames 44 contains a plurality of spectral parameters 46, each of which represents the sound energy at one of a series of different frequency bands. In FIG. 3, the frame shown has forty spectral parameters, but in other embodiments of the invention frames with a different number of spectral parameters can be used.

According to the method of FIG. 2, each spectral frame, such as the indicated frame 44A, has a slope parameter calculated in association with each of a plurality of groups of spectral parameters, where the spectral parameters in each such group come from a given portion, or range, of the total frequency spectrum represented by the frame. As is described in greater detail below, a slope parameter is calculated for each such group by comparing each given spectral parameters of the group with spectral parameters in a preceding frame 44B and a following frame 44C which are above and below the given spectral parameter in frequency. Such a slope parameter is calculated for each such group to produce a set of slope parameters 48A for the frame 44A. As is shown at the bottom of FIG. 2, this set of slope parameters 48A is added to the frame 44A to form an augmented frame 50A. After this has been performed for each frame in the sequence 42, a new sequence 52 of augmented frames 50 is produced in association with the original sequence of frames 42.

Referring now to FIG. 4, a subroutine is provided for calculating slope parameters according to a preferred embodiment of the present invention. This subroutine is written in the well-known C programming language, and is entitled get_slope, as is shown in line 60. The line 60 also states that get_slope is designed to return a value which is a 16-bit integer, and is designed to be called with the parameters "early," "now," "late," "mini," and "maxi." Line 62 states that the parameters "early," "now," and "late," are each arrays of unsigned 8-bit integers. "Now" represents the frame 44A for which a given slope parameter is to be calculated. "Early" and "late" represent the frames 44B and 44C with which the parameters of the "now" frame are to be compared in order to calculate the slope parameter. "Now," "early," and "late," are each arrays, because they each represent a series of spectral parameters 46.

Line 64 of the subroutine indicates that the values "mini" and "maxi" are both 16-bit integers. These values are used to define the range of spectral parameters for which a given call to get_slope is to calculate a slope parameter. For example, in the embodiment of the invention which uses the 40-parameter spectral frame 44A shown in FIG. 3, slope parameters are calculated for 12 different ranges of spectral parameters, labeled R1 through R12 in FIG. 3. Each such range is comprised of a group of three successive spectral parameters. The subroutine get_slope is called separately for each such range, and each time it is called, "mini" defines the lowest frequency parameter of the range for which the call is being made, and "maxi" defines the highest frequency parameter of that range. For example, when get_slope is being called to calculate a slope parameter for the range R1 shown in FIG. 3, "mini" would be set to three and "maxi" would be set to five.

Line 66 of get_slope defines two variables, "i" and "ii", which are used as indexes in the loops contained within the subroutine. Line 68 defines an array called "slopes" which is comprised of five 16-bit integers. As will be described below, this array is used to hold the differences which are used to calculate the slope value returned by the subroutine get_slope.

Line 72 starts a "for" loop which extends all the way down to the closing brace on line 80. This "for" loop causes the instructions contained on line 72 through 78 to be performed five separate times, with the value of the index "ii" being incremented by one on each time, so that during the five iterations "ii" varies from minus two to two. Each iteration of the "for" loop which starts on line 70 causes one of the five values in the array "slopes" to be calculated, starting with a first value "slopes[0]" and ending with a final value "slopes[4]".

On each iteration of the "for" loop which starts on line 70, the line 72 resets to zero the value in the "slopes" array which is to be calculated in that iteration. Then lines 74 through 78 execute another, inner, "for" loop, which performs a separate iteration for each parameter in the range of parameters for which get_slope is currently being called. This is done by causing the index "i" to vary from the value "mini" to the value "maxi." Each iteration of this "for" loop adds the absolute value of two times the value of the "i"th spectral parameter of the "now" frame minus the ("i"+"ii")th parameter in "late", the following frame, and minus the ("i"−"ii")th parameter in "early", the preceding frame. As is indicated in line 76, this absolute value is added to the value of the "slopes" array currently being calculated by each iteration of the inner "for" loop that starts on line 74.

The operation of the outer "for" loop, which starts on line 70, is illustrated in FIGS. 5A through 5E. Each of these figures illustrates one iteration of that "for" loop. In all of them, it is assumed that the value of "mini" is three and the value of "maxi" is five.

Figures 5A, 5B, 5C, 5D, 5E:
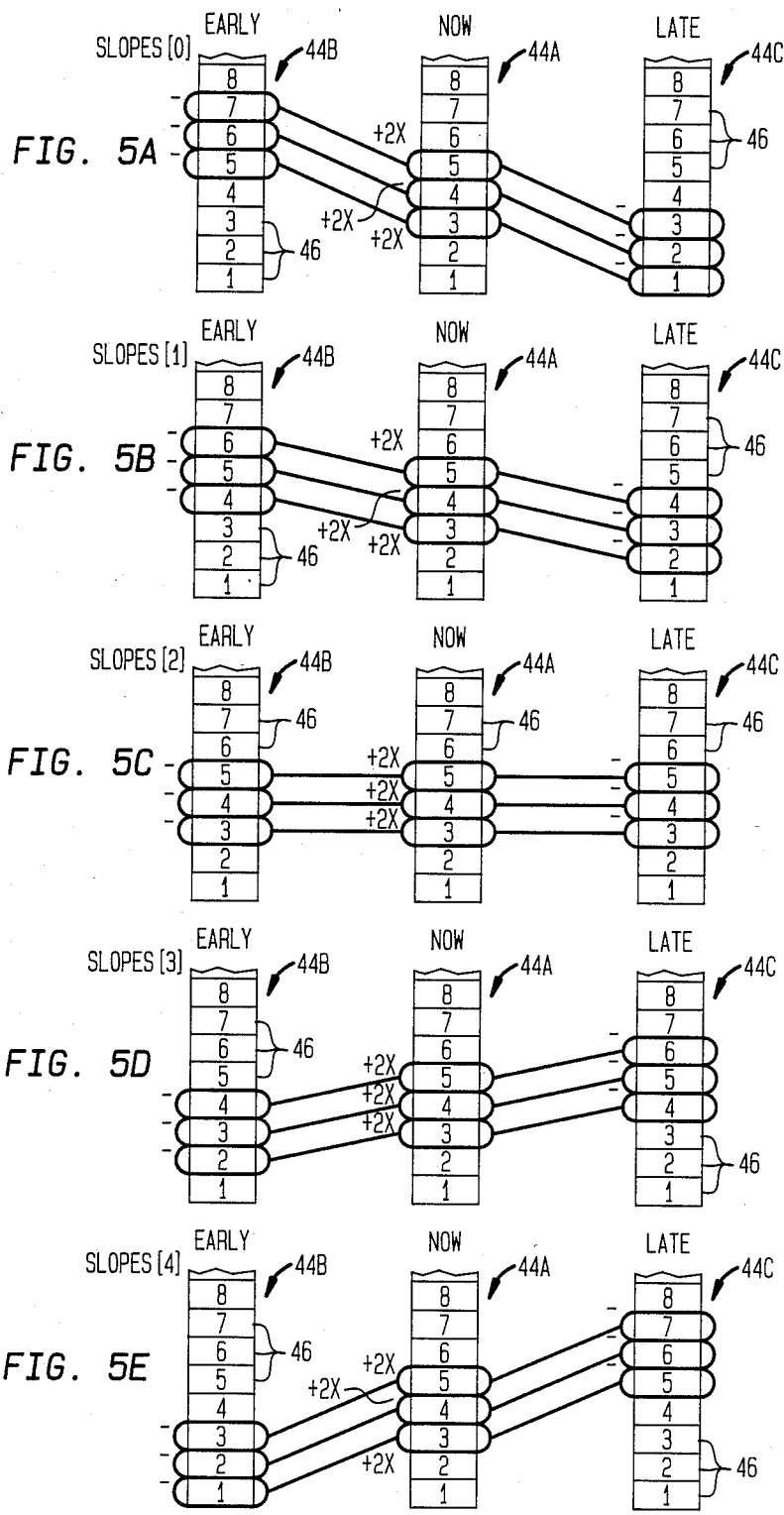
FIGS. 5A, 5B, 5C, 5D, and 5E are schematic representations of the various spectral parameter differences which are calculated in the subroutine of FIG. 4.

FIG. 5A illustrates the first iteration of the outer "for" loop, that which occurs when the value of "ii" is minus two, which causes parameters in the "now" frame to be compared with parameters in the "late" frame which are two parameters below them and parameters in the "early" frames which are two parameters above them. In this iteration the value "slopes[0]" is calculated, because "ii+2" equals zero. When the inner "for" loop starting on line 74 is initiated, the value of the index "i" is three, because, as is stated above "mini" is three. Thus the first pass of this inner "for" loop adds the following absolute value to "slopes[0]": two times the third spectral parameter of the "now" frame 44A, minus the first spectral parameter of the "late" frame 44C and minus the fifth spectral parameter of the "early" frame 44B. In the second pass of the inner "for" loop, the index "i" is increased by one, to four. Thus on this second pass, the absolute which is added to "slopes[0]" is equal to two times the fourth parameter of the "now" frame, minus the second parameter of the "late" frame and the sixth parameter of the "early" frame. On the third pass of the inner "for" loop, "i" equals five. Thus the absolute value added to "slopes[0]" equals two times the fifth parameter of the "now" frame minus the third parameter of the "late" frame and the seventh parameter of the "early" frame.

Once this third pass of the inner "for" loop is complete, this inner "for" loop is exited, because if "i" were incremented for the next pass it would be six, which would no longer be less than or equal to "maxi", as is required by the range limitation "i(=maxi" contained on line 74. At this point, the first iteration of the "for" loop starting on line 70 is completed. This cause the subroutine get_slope to start another iteration of the outer "for" loop which starts on line 70.

The second iteration of the outer "for" loop increments the index "ii" from minus two to minus one, so that the spectral parameters from the "now" frame 44A are compared with parameters in the "late" and "early" frames which are only one parameter higher or lower. Since "ii" equals minus one, this iteration calculates the value of "slopes[1]". It sets "slopes[1]" equal to zero on line 72, and then adds three successive values to it in three successive passes of the inner "for" loop which starts on line 74. The first pass of this "for" loop sets "i" to three and increases "slopes [1" by the absolute value of two times the third spectral parameter of the "now" frame minus the second spectral parameter of the "late" frame and the fourth spectral parameter of the "early" frame. In the second pass of the inner "for" loop, "slopes[1[" is increased by the absolute value of two times the fourth parameter of the "now" frame minus the third parameter of the "late" and the fifth parameter of the "early" frame. Finally, the third and last pass of the inner "for" loop, increases "slopes[1]" by two times the fifth parameter of the "now" frame minus the fourth parameter of the "late" frame and the sixth parameter of the "early" frame.

As those skilled in C programming will understand, the process described above with regard to FIGS. 5A and 5B is repeated for each of the next three iterations of the outer "for" loop which starts on line 70, with the shift between the parameters in the "late" and "early" frames which are subtracted from the parameters in the "now" frame being changed by one in each successive iteration.

Once each of the five iterations of the outer "for" loop have been completed, the subroutine advances to line 82 which causes the subroutine to return to its calling program with a slope parameter which is calculated according to the following expression:

$$\frac{\text{slopes}[0] - \text{slopes}[4]}{8} + \frac{\text{slopes}[1] - \text{slopes}[3]}{4}$$

Figure 7:
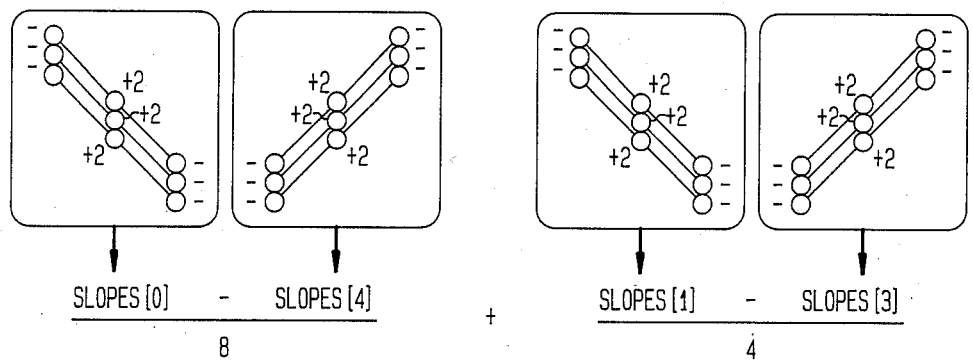
FIG. 7 is a schematic representation of the expression used to calculate the slope parameter returned by the subroutine of FIG. 4.

This formula, which is illustrated schematically in FIG. 7, is designed to produce a slope parameter which is positive when the frequency of the energy in the spectral range for which get_slope has been called is rising, and which is negative when the frequency of the energy in that range is falling. This is because "slopes[0]" and "slopes[1]" tend to be positive when the frequencies of such energies are rising, and "slopes[4]" and "slopes[3]" tend to be positive when those energies are falling.

As is shown in FIG. 6A, "slopes[0]" tends to be positive when the frequency of audio energy is rising in its associated spectral range. When a rising band of energy 90 passes through the parameters of the "now" frame used to calculate a given "slopes[0]", that band makes a positive contribution to "slopes[0]" which is twice that band's energy in those parameter. But the negative contribution made by such a rising energy band tends to be smaller than its positive contribution because the angle of the rising band tends to make it fail to pass through all the parameters in the "early" and "late" frames which make negative contributions to "slopes[0]". As a result, rising energy bands tend to make "slopes[0]" positive.

As is shown in FIG. 6B, a downward moving band of energy 92 tends to contribute as much to the parameters in the "early" and "late" frames which make negative contributions to "slopes[0]" as it does to the parameters of the "now" frame which make positive contributions. Thus downward-moving bands of energy tend to make "slopes[0]" close to zero.

Just the opposite occurs in the calculation of "slopes[4]." As 6C shows, an upward-moving band of energy 90 tends to contribute as much to the parameters of the frames "early" and "late" which make negative contributions to "slopes[4]" as it does to the parameters of the frame "now" which make positive contributions to that value. Thus rising bands of energy tend to make "slopes[4]" approach zero. But as FIG. 6D shows, a downward-moving band of energy 92 tends to contribute more to the parameters of frame "now" which make positive contributions to "slopes[4]" than it does to the parameters of the frames "early" and "late" which make negative contributions to that value. Thus falling bands of energy tend to make "slopes[4]" have a positive value.

"Slopes[1]" is similar to "slopes[0]" and "slopes[3]" is similar to "slopes[4]", except that the shift in frequency between the parameters used from the "now" frame and those used from the "early" and "late" frames is only one frequency band in "slopes[1]" and "slopes[3]", rather than two frequency bands, as in "slopes[0]" and "slopes[4]". Thus "slopes[1]" tends to produce positive values for upward-moving bands of energy and near zero values for downward-moving bands of energy, whereas "slopes[3]" tends to produce positive values for downward-moving bands of energy and near zero values for upward moving bands of energy.

As FIG. 6E shows, a band of energy 94 which remains constant in frequency tends to produce a slope parameter which is close to zero, since it makes the opposite contribution to "slopes[0]" and "slopes[1]" that it makes to "slopes[4]" and "slopes[3]", and, thus, according to the expression set forth on line 82 of FIG. 4 and in FIG. 7, slope parameters in the vicinity of a band of energy which is not changing in frequency tend to be zero.

In the preferred embodiment of the invention, the expression used to calculate the value returned to get_slope divides the difference between slopes[1] and slopes[3] by 4, while it divides the difference between slopes[0] and slopes[4] by 8, causing the latter difference to make a smaller contribution to the resulting slope parameter. It does this to compensate for the fact that a given frequency change tends to produce a larger value in the difference between slopes[0] and slopes[4] than it does for the difference between slopes[1] and slopes[3]. It should be understood, however, that different combinations of these two differences could be used to derive a slope parameter, since either difference could be used as the slope parameter by itself.

The frequency ranges R1 through R12 are selected so that the bottom parameter in the bottom range R1 is at least two parameters above the lowest parameter of each frame, and the top parameter in the top range R12 is at least two parameters below the highest parameter of each frame. This is done so because the calculations of "slopes[0]" and "slopes[4]" require parameters which are two parameters below and two parameters above a their corresponding parameters in the "now" frame.

As can be seen from the expression shown on line 82 of FIG. 4 and in FIG. 7, the value of "slopes[2]" is not used in the calculation of slope parameters. The only reason "slopes[2]" is calculated by get_slope is that it would require additional code to make the outer "for" loop which starts on line 70 of that subroutine to skip the iteration in which "ii" is zero.

The value returned by get_slope is defined as a sixteen bit integer, which can have a positive or a negative value. But the parameter values of each of the frames 44 are stored in arrays of unsigned eight bit integers, whose values are limited to a range from zero to two hundred and fifty-five. For this reason the value returned by get_slope is truncated if it is below minus one hundred and twenty-eight, or if it is above a positive one hundred and twenty-seven. Then one hundred and twenty-eight is added to the resultant-value, to produce a spectral parameter which is limited to a range between zero and two hundred and fifty-five, and thus which can be represented in one byte as an unsigned eight bit integer. It should be understood that in such an eight bit slope parameter, any value below 128 represents a negative slope.

Once get_slope has been called for each of the spectral ranges R1 through R12 shown in FIG. 3, a corresponding plurality of eight-bit slope parameters SP1 through SP12 will have been calculated. Together this group, or block, of slope parameters is labeled 48A. In the preferred embodiment of the invention, the block of slope parameters 48A calculated for each frame 44A is added to the spectral parameters of that frame to form an augmented frame 50A, as is indicated in FIGS. 2 and 3.

Figure 8:
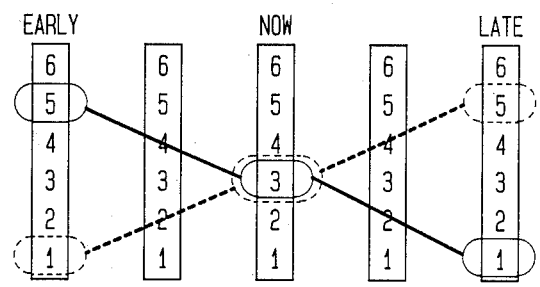
FIG. 8 is a schematic representation of the method by which an alternative embodiment of the invention calculates slope parameters by taking the difference of spectral parameters between frames which are separated from each other by at least one intervening frame.

Referring now to FIG. 8, in alternate emodiments of the invention, the subroutine get_slope is called with the preceding frame, "early," preceding the frame "now" by two frames and the following frame "late" following "now" by two frames. When this is done, the subroutine get_slope calculates parameters in exactly the same way as that discussed above, except that the resulting slope parameter indicates the change in frequency which has occurred over a broader range of time. In other embodiments of the invention the time between the "early", "now", and "late" frames can be even larger than that represented in FIG. 8, but in order for the slope parameters to have much significance, the "early" and the "late" frame should be a frame which is nearby the "now" frame, that is, be near enough to them so that the time difference between them and the "now" frame is sufficiently small to capture the transitions which occur between individual phonemes in normal speech.

Figure 9:
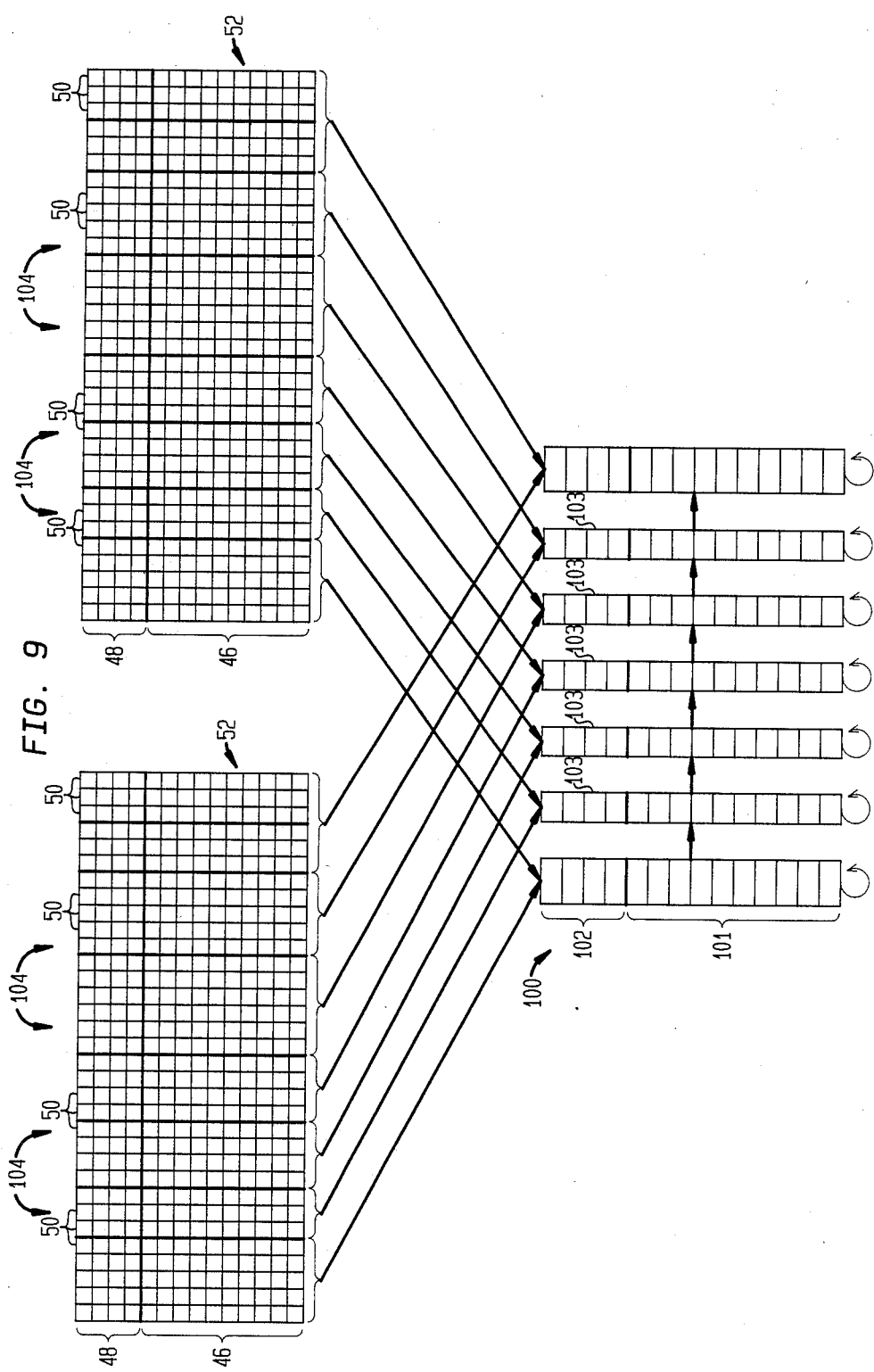
FIG. 9 is a schematic representation of a method according to an embodiment of the invention by which dynamic programming is used to derive speech-unit models, each of which is comprised of a sequence of node models, with each node model containing models of both the slope and spectral parameters of frames associated with the sound represented by the node model.

Referring now to FIG. 9, in one preferred embodiment, the invention is used in a method of speech recognition. The method is designed to recognize an utterance which has been represented as a sequence 52 of augmented frames 50 of the type described above. The speech recognition method uses dynamic programming to compare each of a plurality of speech-unit models 100 against the frame sequence to be recognized. Each such speech-unit model represents a unit of speech, normally a word, which includes a succession of speech sounds. Each such speech-unit model is comprised of a plurality of node models, each of which contains a statistical model 103 of the spectral parameters associated with augmented frames produced when speaking the part of the speech unit represented by that node model. Each such node model also includes a part 102 which models the slope parameters of the same frames.

The sequential speech-unit, or word, model 100 for each word is derived in the following manner. The person whose words are to be recognized by the system speaks one or more training utterances of each word the system is to recognize. Each of these training utterances are then converted into a sequences 52 of augmented frames 50 by the method described above. Then each training utterance of a given word is divided into a plurality of groups, or segments, 104 of successive augmented frames 50. The boundaries between the segments 104 should be selected, so that, to the extent possible, each segment 104 represents a grouping of relatively similar frames. If there are multiple training utterances of a given word, as is shown in FIG. 9, they should all be divided into corresponding sets of segments, so that corresponding segments in different utterances of the same word correspond to the same part of that word.

Figure 10:
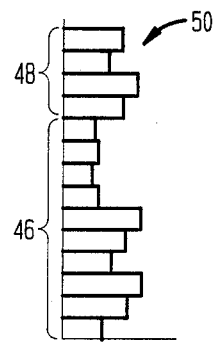
FIG. 10 is a schematic representation of the slope and spectral parameters of an individual frame of the type shown in FIG. 9.

Once the one or more training utterance of a given word have been divided into corresponding segments, a statistical node model is derived to present all the frames which belong to each set of corresponding segments in the one or more utterances of the word. As is indicated in FIG. 10, each frame is a series of scalar parameter values, including the spectral parameter values 46, which represent the amount of energy at each of a plurality of frequency bands, and the slope parameters 48, which indicate the change in the frequency of energy at each of a plurality of frequency ranges.

Figure 11:
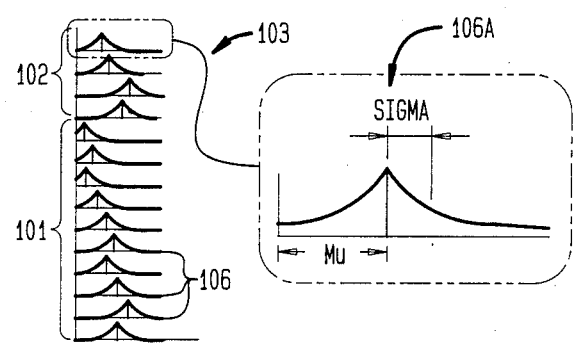
FIG. 11 is a schematic representation of an individual node model of the speech-unit model shown in FIG. 9.

The node model calculated from the frames associated with a given set of corresponding segments has the general form indicated schematically in FIG. 11. It is a multi-dimensional probability distribution model, where each dimension 106 of the probability distribution corresponds to one parameter of the frames from which the node model is calculated. Each such dimension is itself a probability distribution model which gives the probability of its corresponding parameter having different values if that parameter occurs in a frame from the part of the word represented by the node model. Each dimension of the probability distribution has an expected value, or mu, which is calculated as the average of that dimension's corresponding parameter in the frames from which the node model is calculated. Each dimension also has a measure of deviation, or sigma, which is calculated as the absolute deviation of that dimension's corresponding parameter in the frames from which the node model is calculated. The probability distribution model of each dimension is represented as a Laplacian probability distribution, which, as is well known in the art of statistics, is completely defined by the mu and sigma of that distribution.

As is indicated in FIG. 11, the dimensions of each node model 103 are divided into two separate categories, (1) the dimensions 101 derived from the spectral parameters 46 from which the node model is calculated, and which model the probability distributions of those parameters in frames occurring in the given part of the word represented by the node model; and (2) the dimensions 102 derived from the slope parameters 48 from which the node model is calculated, and which model the probability distributions of those slope parameters in those same frames. Although the spectral parameter probability distribution models 101 and the slope parameter probability distribution models 102 represent different characteristics of the frames represented by each node model 103, they both represent the probability distribution of eight-bit parameter values and they are both calculated and represented in the same manner.

For a more detailed discussion of the basic concepts behind deriving probabilistic node models to represent a speech unit, such as a word, please refer to U.S. patent application Ser. No. 862,275 filed by Gillick et al. on May 12, 1986, entitled "A Method for Representing Word Models for Use in Speech Recognition." This prior application is assigned to the assignee of the present application and is incorporated herein by reference.

Figure 12:
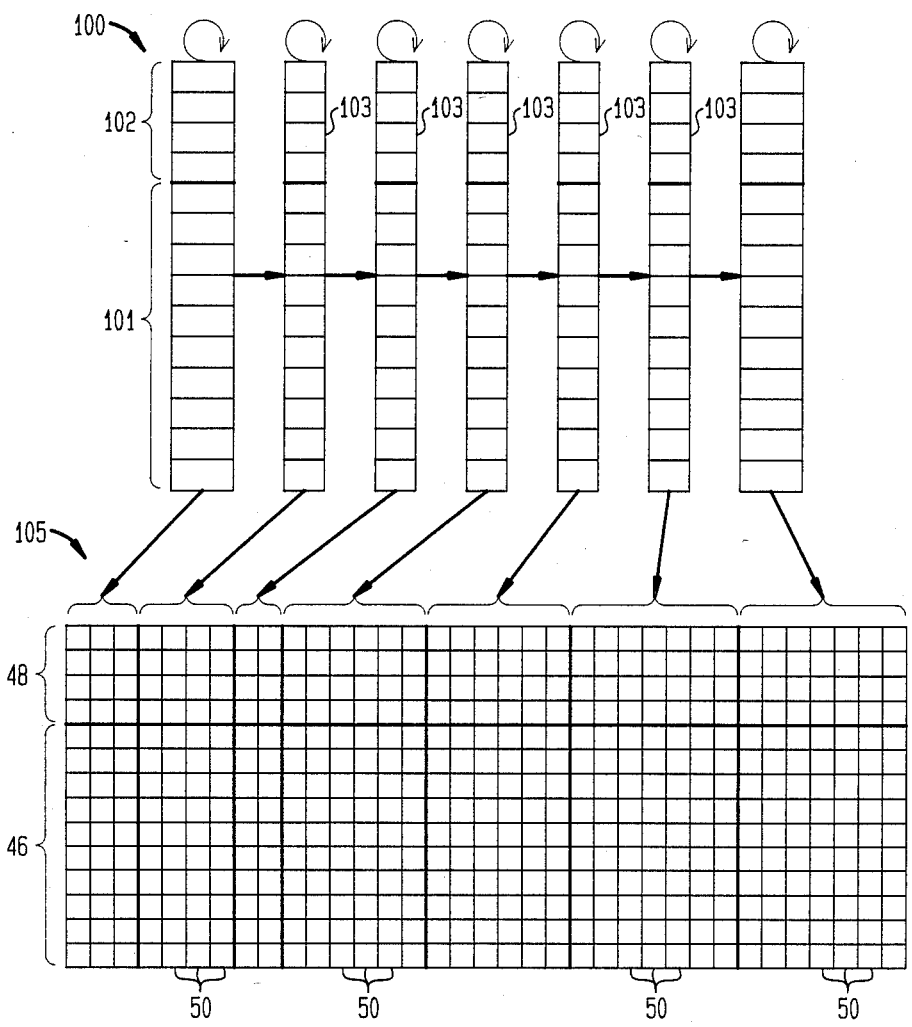
FIG. 12 is a schematic representation of the process according to an embodiment of the invention by which one of a plurality of speech-unit models, each of which is comprised of a plurality of node models, such as that derived in FIG. 9, is compared against a sequence of frames to be recognized to determine which speech unit compares most closely to that frame sequence.

Referring now to FIG. 12, once a plurality of word models 100, each of which comprises a plurality of node models, is calculated according to the method just described, these speech-unit models can be used to recognize spoken words. This is done by using dynamic programming to compare the sequence of node models 103 of each such word model 100 against a sequence 105 of augmented frame 50 representing an utterance to be recognized. As those skilled in the art of dynamic programming will appropriate, such a dynamic programming method seeks to find an optimal match between the sequence of node models 103 and the sequence of frames 50. A score is produced for the hopefully optimal match between the frame sequence and each word model, indicating the probability that the utterance corresponds to the word represented by each such word model. The best scoring word or words are then selected as most probability corresponding to the utterance.

For a much more detailed description of such a dynamic programming speech recognition scheme, please refer to the above mentioned U.S. patent application Ser. No. 727,249.

In the dynamic programming process of FIG. 12, the augmented frames 50 contain both spectral parameters 46 and slope parameters 48 and the node models contain both spectral parameter models 101 and slope parameters models 102. Thus the score produced for each word is determined not only as a function of the closeness of the spectral parameters in the frame sequence with the spectral parameter models contained in the word model 100, but also as a function of the closeness of the slope parameters in those frames and the slope parameter models 102 contained in the word model 100. It should also be understood, that the dynamic programming algorithm does not make any distinction between spectral and slope parameter, or between slope parameter models and spectral parameter models. This is because the present invention enables slope parameters to have the same mathematical form as spectral parameters, and slope parameter models to have the same mathematical form as spectral parameter models.

Figure 13:
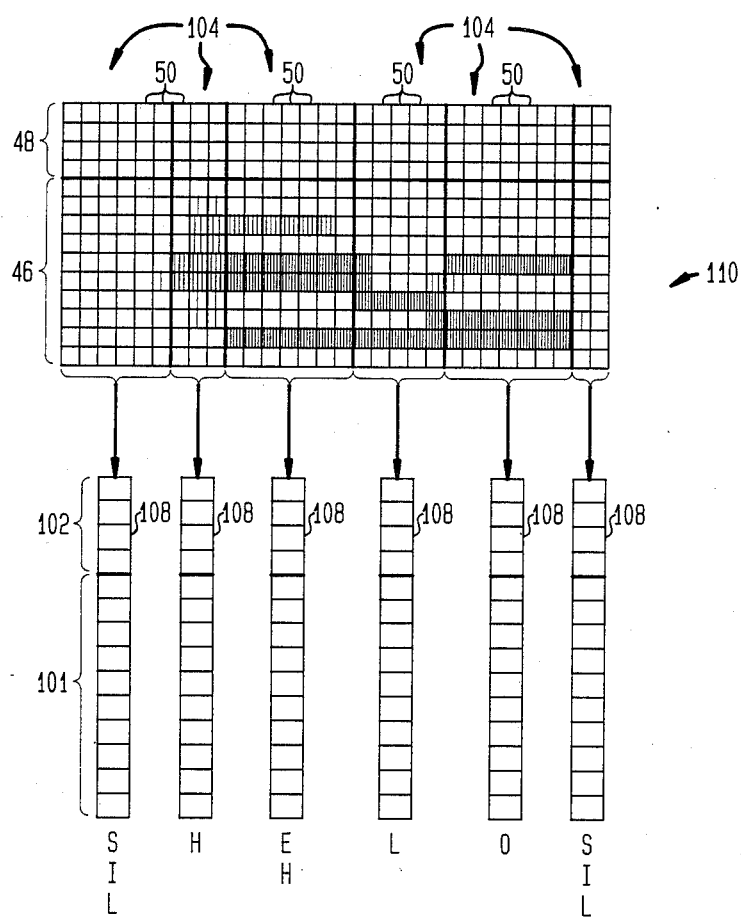
FIG. 13 is a schematic representation of a method according to another embodiment of the invention by which individual phoneme models are derived from a sequence of frames by segmenting the sequence into groups of frames associated with individual phomenes, and by calculating a model for each phoneme from the frames associated with it by the segmentation.
Figure 14:
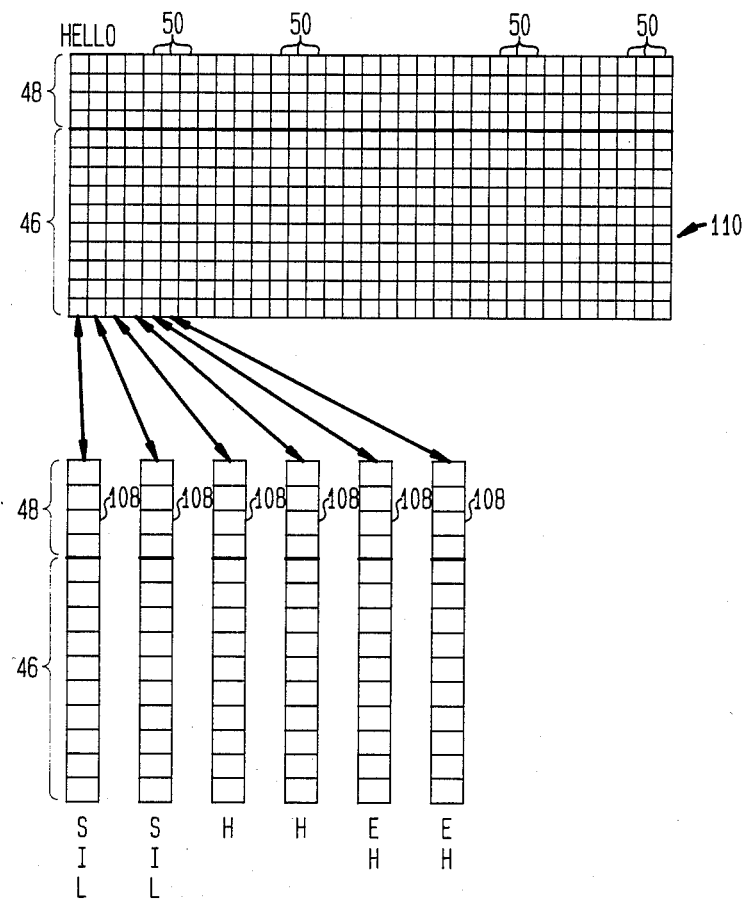
FIG. 14 is a schematic representation of a method according to another embodiment of the invention by which a sequence of frames can be labeled by comparing each such frame against a plurality of the phoneme models of the type derived by the method of FIG. 13 to determine which of those phoneme models compares most closely with each such frame.

Referring now to FIGS. 13 and 14, another embodiment of the invention is shown in which the speech-unit models compared against a sequence of frames each represent an individual phoneme. Many speech scientist define "phonemes" to be the smallest units of speech that serve to distinguish one utterance from another. In this application and the claims that follow, however, the word "phoneme" is used slightly differently to mean a speech sound which is modeled by single frame model.

According to the embodiment of the invention represented in FIG. 14, a speech recognition method compares each frame 50 in a sequence 110 of frames against each of a plurality of phoneme models 108 to determine which one or more phoneme models most probably correspond to each such frame. According to the preferred embodiment, each frames 50 contains both spectral parameters 46 and slope parameters 48, as is indicated in FIG. 10, and each phoneme models contains a single frame model which is similar in form to the node model 103 shown in FIG. 11 and, thus, which contains both spectral parameter models 101 and slope parameter models 102.

The comparison between each frame 50 and each phonetic model 108 produces a partial likelihood score for the comparison between each parameter value, including both spectral and slope parameter values, of the frame with each dimension of the phoneme model's probability distribution. The Laplacian probability distribution of each such dimension associates a probability or likelihood value with each possible value of its corresponding frame parameter. The partial likelihood score calculated for each parameter is based on this probability value. A likelihood score for the entire frame is calculated by combining the partial likelihood scores produced by comparing each of its parameters against its corresponding dimension of the phoneme model. For a more detailed description of the calculation of likelihood scores, please refer to the above mentioned U.S. patent application Ser. No. 727,249.

As is shown in FIG. 13, the phonetic frame models 108 are produced in a manner generally similar to that in which the node models 103 of the word models 100 are formed. That is, a sequence of frames 110 associated with each of a plurality of utterances is divided into segments 104 of frames 50. To the extent possible, the frame sequence should be divided into segments so that the frames within each segment can be modeled relatively accurately by a single phoneme frame model 108. As is known in the art of speech recognition, such segmentation can be produced automatically by the use of a dynamic programming technique similar to that described in the above mentioned U.S. patent application Ser. No. 862,275. Such segmentation can also be produced manually by graphically representing the spectral frames of an utterance so that they make a spectrogram, as is indicated schematically in FIG. 13, and having a human view that spectrogram and divide its frames into segments according to rules known in the art of speech recognition.

Once a sequence of frames has been divided into a plurality of segments 104, each of which is associated with the sound of a given phoneme, the frames of each segment 104 are combined to form a phoneme frame model 108 according to the same basic process used to calculate the node models 103 described above with regard to FIGS. 9, 10, and 11. Preferably, each such phoneme model is calculated from the frames of a plurality of such segments associated with the occurrence of its associated phoneme in a plurality of different words. This causes the probability distributions associated with each phoneme model 108 to be derived from a larger and more representative sample of the frames.

Once models have been derived for each of a plurality of phonemes, the speech recognition process of frame labeling can begin. This is done by comparing each augmented frame 50 in a sequence 110 of such frames to be recognized against each of a plurality of phonetic frame models 108, as described above with regard to FIG. 14 and. The phoneme whose frame model produces the best likelihood score when compared against a given frame is associated with that frame. After this process is performed for each frame in the sequence 110, that sequence will have associated with it a sequence of phonetic labels which indicate its various speech sounds. This sequence of phonetic labels provides a crude form of speech recognition, since, in some cases, it is accurate enough to enable humans to read what words has been spoken, or at least to detect the presence of certain speech sounds. More importantly, such a sequence of phonetic labels can be used as a first step in a more elaborate speech recognition process, as has been demonstrated before in the speech recognition art.

Figure 15:
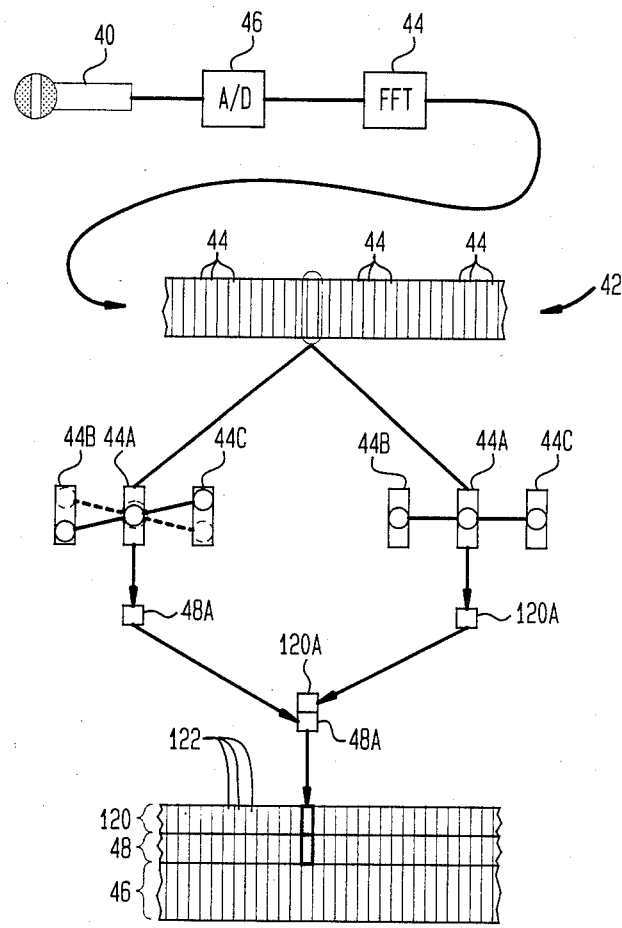
FIG. 15 is a schematic representation of the method similar to that shown in FIG. 2, except that it also includes calculating energy difference parameters by comparing spectral parameters of a given frame with the same spectral parameters in frames before and after it, and adding the resulting energy difference parameters to each augmented frame.

FIG. 15 illustrates an alternate embodiment of the invention, which is similar to the embodiment discussed above with regard to FIG. 2, except that this alternate embodiment include not only the calculation of, and addition to the spectral parameters of, slope parameters 48A, but also the calculation of, and addition to the spectral and slope parameters of, a group of energy difference parameters 120A. The energy difference parameters are calculated by a subroutine get_difference, which is not shown because of its simplicity and its similarity to get_slope. Like get$_{13}$ slope, get_difference is called with the parameters "now," "early," "late," which signify the current frame 44A, the previous frame 44B, and the following frame 44C, respectively. It is also called with the parameters "mini" and "maxi," which indicate the range of parameters for which the energy difference parameter produced by a given call to get_difference is calculated.

Figure 16:
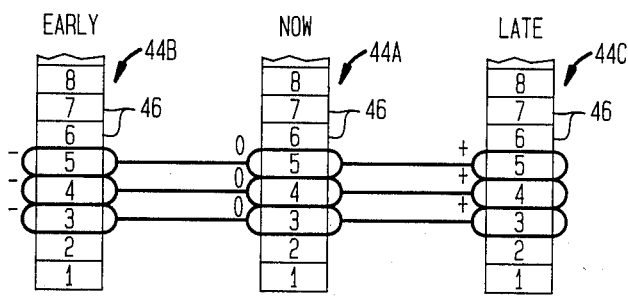
FIG. 16 is a schematic representation of the method by which an energy difference parameter of the type represented in FIG. 15 is calculated.

As is indicated in FIG. 16, get_difference produces an energy difference parameter by summing over each of the spectral parameters from "mini" to "maxi" the difference between the correspondingly numbered parameter in the "early" frame and the correspondingly numbered parameter in the "late" frame. Thus the resultant energy difference parameter is an indication of the extent to which sound energy is increasing in the vicinity of the "now" frame at the frequency range from "mini" to "maxi."

Preferably an energy difference parameter is calculated for each of the ranges of frequencies for which a slope parameter is calculated and the resulting differences are scaled and truncated so that they are limited to a range between minus one hundred and twenty-eight and a positive one hundred and twenty-seven. Then one hundred and twenty-eight is added to each such resulting value to produce an energy difference parameter which is limited to a range between zero and two hundred and fifty-five, so that it can be represented by eight bytes, just like the spectral and slope parameters of each frame. Once this is done the block 120 of energy difference parameters calculated for a given frame are added, along with its slope parameters 48, to the spectral parameters 46 of that frame to produce an augmented frame 122.

These augmented frames 122 can be used to produce word models comprised of a plurality of node models, similar to the models 100 described above, except that they include energy difference parameter models as well as slope and spectral parameter models. Once produced such word models can be used with dynamic programming to recognize the utterances of words which are represented as a sequence of augmented frames 122. Similarly the augmented frames 122 can be used to produce phoneme models similar to the phoneme models 108 described above, except that they also include energy difference parameter models. Such phoneme models can then be used to associate phonemes with each of a succession of such frames.

It can be seen that the present invention provides methods of speech analysis and speech recognition which make use of information about changes in the frequency and amplitude of speech energy. Furthermore, the invention provides methods for using such information in the context of a frame-based representation of speech. Since the invention makes it possible to represent changes in frequency and amplitude in the form of frame parameters, it enables such information to be represented and computed in an efficient manner.

A major benefit of the present invention is its relative immunity from making the type of perceptual errors which commonly occur in formant tracking systems. This results because the invention does not require the making of perceptual decisions about whether or not a formant exists and, if so, where. Instead, the invention provides a method of indicating changes in frequency by merely calculating slope parameters as a function of the relative values of neighboring spectral parameters.

The invention makes it possible to use information about acoustic changes that take place over several frames in methods which phonenetically label frames by comparing individual frames against individual phoneme frame models.

In the description above, the invention has been used to derive slope parameters and energy difference parameters. It should be understood, however, that the invention is not limited to the calculation of such parameters, but is intended to extend to other type of difference parameters which are calculated as a function of the difference between an acoustic parameter in one frame and an acoustic parameter in a nearby frame.

In the description above, the frames used to derive the augmented frames are all comprised of basically spectral parameters. It should be understood, however, that in certain embodiments of the invention acoustic parameters other than spectral parameters, such as linear predictive coding parameters, can be used. The differences between such parameters can be used to calculate difference parameters according to the present invention.

In the description above, the probability distributions used in the node models and phoneme models are all Laplacian distributions, each dimension of which is defined by a mu, or means, and a sigma, or absolute deviation. It should be understood that other types of probability distributions can be used with the present invention, such as probability distributions which use other measures of central tendency besides means, and other measures of spread besides the absolute deviations, In the preceding text, the slope and energy difference parameters have all been calculated for a range of parameter values. It should be understood, however, that in alternate embodiments of the invention such slope and energy difference parameters can be calculated for individual parameters rather than ranges of such parameters.

In the preceding text and in the claims that follow, the phrase "dynamic programming" has been used to broadly include all methods used in the art of speech processing for optimally time aligning a sequence of frames against a sequence of nodes or arcs. The phrase is meant to include both the Viterbi algorithm and the Baum-Welch algorithm, even though some purists consider the Baum-Welch algorithm to be a "dynamic programming-like" rather than actual dynamic programming algorithm.

In the claims that follow the phrase "dynamic programming elements" is meant to refer both to the nodes of a dynamic programming model or the arcs of such a model, if probability distributions have been calculated for such arcs.

Accordingly, the present invention should not be considered to be limited by the description herein of the preferred embodiment, but rather should be interpreted in accordance with the following claims:

What we claim is:

1. A method of speech analysis comprising:
   representing a length of speech as a temporal sequence of frames, with each frame representing speech sounds at one of a succession of brief time periods;
   analyzing each frame of speech to obtain a plurality of spectral parameters, each of which represents the energy at one of a series of different frequency bands;
   finding the difference between the energy of a given spectral parameter of a given frame and the energy, in a nearby frame, of a spectral parameter associated with an energy band which is close to, but different than, the frequency band represented by said given spectral parameter; and
   using that difference to calculate a slope parameter which provides an indication of the extent to which the frequency of the acoustic energy in the part of the spectrum represented by said given spectral parameter is going up or going down.

2. A method as described in claim 1, further including:
   calculating one or more such slope parameters for each of a plurality frames from the sequence of frames; and
   comparing the slope parameters which have been calculated for the sequence of frame against each of a plurality of acoustic models representing speech units, where each such speech-unit model has a model for the slope parameters associated with frame that correspond to the speech unit it represents.

3. A method as described in claim 2, wherein:
   each such speech-unit model has a model of the spectral parameters, as well as the slope parameters, associated with frames that correspond to the speech unit it represents; and
   said comparing includes comparing the spectral parameters, as well as the slope parameters, from individual frames against each of said plurality of speech-unit models.

4. A method as described in claim 2, wherein:
   said calculating of slope parameters associates one or more slope parameters with each frame of said sequence of frames;
   said speech-unit model is comprised of a sequence of dynamic programming elements each of which includes one or more slope parameter models; and
   said comparing includes using dynamic programming to compare the sequence of slope parameters associated with the sequence of frames against the sequence of dynamic programming elements associated with each of said speech unit models.

5. A method as described in claim 1, wherein:
   said finding of the difference between the energy of a given spectral parameter and a spectral parameter in a nearby frame includes:
   finding a first difference between the energy of said given spectral parameter of said given frame and the energy, in a frame occurring close after said given frame, of a spectral parameter associated with a frequency band which differs in frequency from the frequency band of the given parameter by an amount X; and
   finding a second difference between the energy of said given spectral parameter and the energy, in a frame occurring briefly before said given frame, of a spectral parameter associated with a frequency band which differs in frequency from the frequency band of the given parameter by approximately an amount $-X$; and
   said using of a difference to calculate a slope parameter includes combining said first and second differences to form a summed difference which is used to calculate said slope parameter.

6. A method as described in claim 1, wherein:
   said finding of the difference between the energy of a given spectral parameter and a spectral parameter in a nearby frame includes:
   finding a first difference between the energy of said given spectral parameter of said given frame and the energy, in a first nearby frame, of a spectral parameter associated with an frequency band which is above the frequency band of the given parameter by an amount X; and
   finding a second difference between the energy of said given spectral parameter and the energy, in a second nearby frame, of a spectral parameter associated with a frequency band which is below the frequency band of the given parameter by approximately an amount X, where said second nearby frame is on the opposite side of said given frame as said first nearby frame; and
   said using of a difference to calculate a slope parameter includes combining the negative of the value of one of said first and second differences to the value of the other of said differences to form a first net difference which is used to calculate said slope parameter.

7. A method as described in claim 6, wherein:
   the absolute value of said net difference is used to calculate said slope parameter.

8. A method as described in claim 6, wherein
   said finding of the difference between the energy of a given spectral parameter and a spectral parameter in a nearby frame further includes:
   finding a third difference between the energy of said given spectral parameter of said given frame and the energy, in a certain nearby frame, of a spectral parameter associated with a frequency band which is above the frequency band of the given parameter by an amount Y, which is larger than X; and
   finding a fourth difference between the energy of said given spectral parameter and the energy, in another nearby frame, of a spectral parameter associated with a frequency band which is below the frequency band of the given parameter by approximately an amount Y, where said another nearby frame is on the opposite side of said given frames as said certain nearby frame; and
   said using of a difference to calculate a slope parameter includes combining the negative of one of said third and fourth differences to the value of the other of those two differences to form a second net difference which is also used to calculate said slope parameter.

9. A method as described in claim 8, wherein both the absolute value of said first net difference and the absolute value of the second net difference are used to calculate said slope parameter.

10. A method as described in claim 1, wherein:
said finding of the difference between the energy of a given spectral parameter and the energy, in a nearby frame, of a another spectral parameter is performed for each of a group of spectral parameters which together represent a subrange of the frequency range represented by all the spectral parameters of that frame; and
said using of that difference to calculate a slope parameter includes combining said differnces calculated for each of said group of spectral parameters to form a slope parameter which provides an indication of the extent to which the frequency of the acoustic energy in the part of the spectrum represented by said group of spectral parameters is going up or going down.

11. A method as described in claim 1, wherein said nearby frame is directly adjacent said given frame in said temporal sequence of frames.

12. A method as described in claim 1, wherein said nearby frame is separated from said given frame in said temporal sequence of frames by at least one intervening frame.

13. A method of speech recognition comprising:
representing a length of speech as a temporal sequence of frames, with each frame representing speech sounds at one of a succession of brief time periods, and with each frame containing a plurality of acoustic parameters;
calculating one or more difference parameters in association with each of a plurality of said frames, with each difference parameter being calculated as a function of the difference between a first acoustic parameter in one such frame and a second acoustic parameter in a nearby frame, in which for one or more of said difference parameters, said first parameter and said second parameter are associated with different frequencies; and
comparing the difference parameters associated with individual frames against each of a plurality of acoustic models representing speech units, where each such speech-unit model has a model for the difference parameters associated with frames that correspond to the speech unit it represents.

14. A method as described in claim 13, wherein:
each frame contains a plurality of spectral parameters, each of which represents the energy at one of a series of different frequency bands;
said calculating of difference parameters includes calculating one or more slope parameters in association with each of a plurality of said frames, with each slope parameter being calculated as a function of the difference between the energy of a spectral parameter in one such frame and the energy of a spectral parameter representing a different frequency band in a nearby frame; and
said comparing of difference parameters against speech-unit models includes comparing slope parameters against such speech-unit models, where each such speech-unit model has a model for the slope parameters associated with frames that correspond to the speech unit it represents.

15. A method as described in claim 13, wherein:
the calculating of difference parameter also involves calculating one or more slope parameters in association with each of a plurality of said frames, where each slope parameter is calculated as a function of the difference between a given spectral parameter in one such frame which represents the energy at a given frequency band and a spectral parameter in a nearby frame which represents the energy at another frequency band;
the speech-unit models also contain models for the slope parameters associated with frames that correspond to the speech unit those speech-unit models represents; and
the comparing of the difference parameters of frames against speech-unit models also includes comparing such slope parameters against the models for such slope parameters contained in the speech-unit models.

16. A method as described in claim 13, wherein:
each such speech-unit model has a model of the spectral parameters, as well as the difference parameters, associated with frames that correspond to the speech unit it represents; and
said comparing includes comparing the spectral parameters, as well as the difference parameters, from individual frames against each of said plurality of speech-unit models.

17. A method as described in claim 13, wherein:
said calculating of difference parameters associates one or more difference parameters with each frame of said sequence of frames;
said speech-unit model is comprised of a sequence of dynamic programming elements, each of which includes one or more difference parameter models; and
said comparing includes using dynamic programming to compare the sequence of difference parameters associated with the sequence of frames against the sequence of dynamic programming elements associated with each of said speech unit models.

18. A method as described in claim 13, wherein:
said calculating of difference parameters associates one or more difference parameters with each frame of said sequence of frames;
each of said speech-unit models represents the acoustic properties of individual frames associated with a given phoneme (define);
said comparing includes comparing the speech-unit models for each of a plurality of phonemes against each of said plurality of frames and associating with each frame the one or more phonemes whose models compare most closely with that frame.

* * * * *